(No Model.) 2 Sheets—Sheet 1.

J. P. B. FISKE.
ELECTRIC MOTOR AND BRAKE MECHANISM THEREFOR.

No. 543,525. Patented July 30, 1895.

Witnesses
E. J. Nottingham
G. F. Downing

Inventor
J. P. B. Fiske
By H. A. Seymour
Attorney (No Model.) 2 Sheets—Sheet 2.
J. P. B. FISKE.
ELECTRIC MOTOR AND BRAKE MECHANISM THEREFOR.
No. 543,525. Patented July 30, 1895.
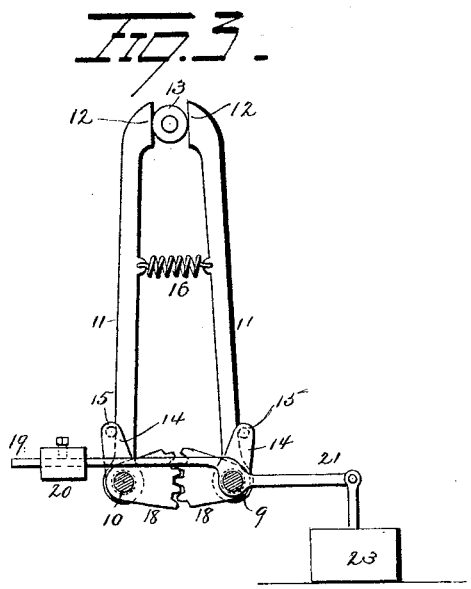
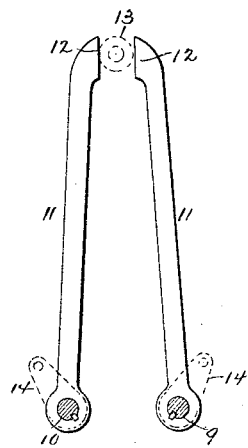
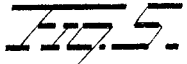
Witnesses
E. J. Nottingham
G. F. Downing
Inventor
J. P. B. Fiske
By H. A. Seymour
Attorney

United States Patent Office.

JONATHAN P. B. FISKE, OF ALLIANCE, OHIO.

ELECTRIC MOTOR AND BRAKE MECHANISM THEREFOR.

SPECIFICATION forming part of Letters Patent No. 543,525, dated July 30, 1895.

Application filed February 9, 1895. Serial No. 537,783. (No model.)

*To all whom it may concern:*

Be it known that I, JONATHAN P. B. FISKE, a resident of Alliance, in the county of Stark and State of Ohio, have invented certain new and useful Improvements in Electric Motors and Brake Mechanism Therefor; and I do hereby declare the following to be a full, clear, and exact description of the invention, such as will enable others skilled in the art to which it appertains to make and use the same.

My invention relates to an improvement in electric motors and particularly to an automatic brake therefor, the object of the invention being to produce simple and efficient means, whereby the counter-torque of the field can be utilized to operate a brake.

A further object is to so construct the apparatus that its operation shall be accurate, easy, and effectual in automatically applying and releasing the brake connected with the armature-shaft of the motor.

A further object is to provide a simple and efficient means for mounting the motor field, so that its counter-torque may be easily utilized for the purpose of operating the brake.

With these objects in view the invention consists in certain novel features of construction and combinations and arrangements of parts, as hereinafter set forth, and pointed out in the claims.

Figure 1:
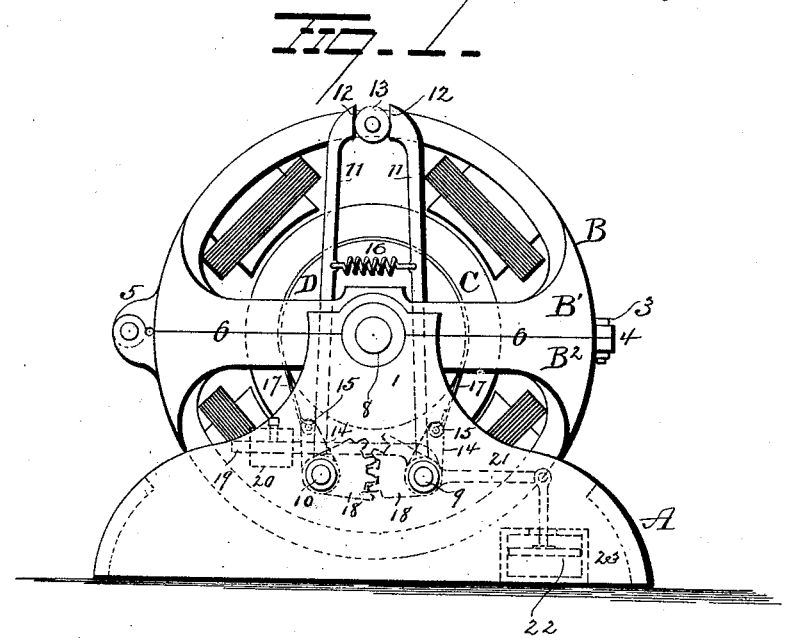
Figure 2:
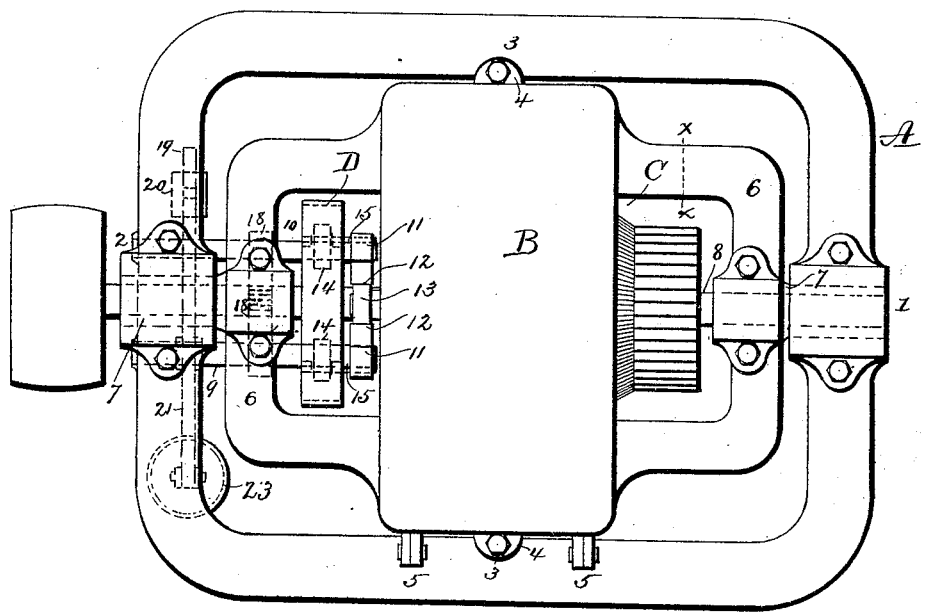

In the accompanying drawings, Figure 1 is a view in elevation illustrating my improvements. Fig. 2 is a plan view. Fig. 3 is a detail view. Fig. 4 is a section on the line $x\ x$ of Fig. 2. Fig. 5 is a view of a modification.

A represents a base or frame having standards 1 2 at its respective ends. Between the standards 1 2 an electric motor B is located, the field-magnet frame of which is made in two parts, B' B², normally secured together by means of bolts 3 passing through lugs 4 made integral with the respective parts of said frame. The parts of the field-magnet frame are also connected together at one side by means of hinges 5 5. By this construction the upper portion B' of the field-magnet frame can be raised on the hinged connections by removing the bolts 3.

The field-magnet frame is made with preferably hollow yokes 6 6, made in two parts, the respective parts of the yokes projecting from the respective parts of the field-magnet frame. From each yoke hollow trunnions 77 project and have their bearings in the standards 1 2. In said hollow trunnions the respective ends of the shaft 8 of the armature C are mounted, and on said armature-shaft a brake-wheel D is secured.

Two rock-shafts 9 10 are mounted in the base or frame A, and to said shafts the lower ends of the vertical arms 11 11 are loosely connected, said arms extending to the top of the field-magnet frame and terminating in flat faces 12 12, disposed at the respective sides of a pin or roller 13 on said field-magnet frame.

To the rock-shafts 9 10 arms or eccentrics 14 14 are secured and provided with pins 15, adapted to normally lie adjacent to the outer faces or edges of the vertical arms 11, and said arms 11 will be maintained substantially parallel with each other at all times by means of a spring 16 connected at its respective ends thereto.

The respective ends of a brake band or shoe 17, which passes over the brake-wheel D, are also connected to the arms or eccentrics 14. To the rock-shafts 9 10 intermeshing toothed segments 18 are secured. An arm 19 projects from the rock-shaft 9, and is provided with an adjustable weight 20, and from the said rock-shaft 9 an arm 21 also projects, the free end of this latter arm being connected with the plunger 22 of a dash-pot 23 located on the base A.

From the construction and arrangement of parts above described it will be seen that the motor is capable of a partial rotation on the trunnions 7 7, and that when the current enters the motor and the armature is made to rotate in one direction the counter-torque of the field-magnets will cause this latter to turn in the reverse direction.

When the motor is at rest the action of the weight 20 will be to maintain the brake-band tight on the brake-wheel D. When the current enters the motor the field-magnet frame will turn on the trunnions 7, owing to the counter-torque in the field-magnets, as above explained, and the pin or roller 13 will cause one or the other of the arms 11 to turn on the rock-shaft, on which it is loosely mounted. The arm 11, which is thus moved, being normally in engagement with the pin projecting from one of the arms or eccentrics 14, the free end of the latter will be moved laterally, and the rock-shaft to which it is secured will be rocked, which motion will be transmitted, by means of the intermeshing toothed segments 18, to the other rock-shaft. The two shafts 9 10 will be thus rocked in reverse directions, and the free ends of the arms 14, to which the ends of the brake-band are attached, will be moved in opposite directions, thus loosening the said band on the brake-wheel and permitting the free running of the armature.

When the parts operate as above explained the weight 20 will be lifted and the action of the dash-pot will be to check the movement of the field-magnet frame. When the current shall have been shut off from the motor, so that the counter-torque of the field-magnets will no longer cause the parts to assume the positions above specified, the action of the weight will be to cause the rock-shafts and the parts connected therewith and the field-magnet frame to assume their normal positions, the brake-band to be tightened on the brake-wheel, and the motion of the armature to be promptly arrested.

It is not essential that the arms 11 be connected loosely to the respective rock-shafts and that the spring be provided for causing them to move together in the same direction, as said arms may be secured to said rock-shafts and move in opposite directions therewith; but I prefer the construction above set forth to prevent either of said arms 11 from conflict with the yokes of the field-magnet frame when they are moved sufficiently far to accomplish the complete release of the brake.

It will be understood that my improved brake devices will operate effectually regardless of the direction in which the motor is made to run.

With a motor intended to run in only one direction one of the rock-shafts and arms 11 may be omitted and one end of the brake-band secured to the framework of the machine.

My improvements are exceedingly simple in construction, cheap to manufacture, and effectual in all respects in the performance of their functions.

Various slight changes might be made in the details of construction without departing from the spirit of the invention or limiting its scope, and hence I do not wish to limit myself to the precise details of construction herein set forth; but, Having fully described my invention, what I claim as new, and desire to secure by Letters Patent, is—

1. The combination with an electric motor having a revoluble member and an oscillatory member, a brake wheel carried by the armature shaft and a brake band on said wheel, of two rock shafts, arms or eccentrics on said rock shafts and connected with the respective ends of the brake band, arms connected with said rock shafts, a projection on the oscillatory member and disposed between said last mentioned arms and intermeshing toothed segments secured to the respective rock-shafts, substantially as set forth.

2. The combination with an electric motor having a revoluble member and an oscillatory member, a brake wheel carried by the armature shaft, and a brake band on said wheel, of two rock shafts geared together and connected with the respective ends of the brake band, arms connected with said rock shaft, a projection on the oscillatory member and disposed between said arms, a weighted lever connected with one of said rock shafts and a dash pot connected with one of said rock shafts, substantially as set forth.

3. The combination with an electric motor having a revoluble member and an oscillatory member a brake wheel carried by the revoluble member, and a brake band on said wheel, of two rock shafts geared together, arms or eccentrics secured to said shafts and connected to the respective ends of the brake band, pins projecting from said arms or eccentrics, arms loosely connected to said rock shafts and adapted to engage said pins, and a projection from the oscillatory member of the motor and disposed between said last-mentioned arms, substantially as set forth.

4. The combination with an electric motor having a revoluble member and an oscillatory member, a brake wheel carried by the revoluble member and a brake band on the brake wheel, of two rock shafts, arms on said rock shafts connected to the respective ends of the brake band, intermeshing toothed segments on the respective shafts, a projection on the oscillatory member of the motor, arms connected to the rock shafts and having their free ends disposed at opposite sides of said projection and a weighted arm connected with one of said rock shafts, substantially as set forth.

5. The combination with a stationary frame, having journal bearings, of a field magnet frame, yokes projecting from the ends of said frame, hollow trunnions projecting from said yokes and mounted on said journal bearings, an armature and an armature shaft mounted in said hollow trunnions and yokes, substantially as set forth.

6. The combination with a stationary frame, of a field magnet frame, hollow yokes projecting from the ends of said field magnet frame, hollow trunnions projecting from said yokes, an armature and an armature shaft mounted in said hollow trunnions, substantially as set forth.

7. The combination with a stationary frame, of a field magnet frame made in two parts removably connected together, yokes projecting from said field magnet frame, trunnions projecting from said yokes and mounted in the stationary frame, an armature and an armature shaft mounted in said trunnions, substantially as set forth.

8. In an electric motor, the combination with a stationary frame, of a field magnet frame made in two parts removably secured together, yokes projecting from said field magnet frame, each yoke being made in two parts, the respective parts of the yokes projecting from the respective parts of the field magnet frame, and a connection between said yokes and the stationary frame.

9. The combination with the field magnet frame of an electric machine, of yokes projecting from the ends of said frame and trunnions from said yokes, substantially as set forth.

10. In an electric motor, the combination with a stationary frame, of a field magnet frame made in two parts removably secured together, yokes projecting from said field magnet frame, each yoke being made in two parts, the respective parts of the yokes projecting from the respective parts of the field magnet frame, and trunnions projecting from said yokes and mounted in the stationary frame, substantially as set forth.

In testimony whereof I have signed this specification in the presence of two subscribing witnesses.

JONATHAN P. B. FISKE.

Witnesses:
 THOS. H. YOUNG,
 R. S. FERGUSON.